United States Patent
Yoshitake et al.

(10) Patent No.: US 6,734,132 B2
(45) Date of Patent: May 11, 2004

(54) POLYMER ELECTROLYTE FUEL CELL, ELECTRODE FOR IT AND METHOD FOR PRODUCING IT

(75) Inventors: Masaru Yoshitake, Yokohama (JP); Naoki Yoshida, Yokohama (JP); Toyoaki Ishizaki, Yokohama (JP); Shinji Terazono, Yokohama (JP)

(73) Assignee: Asahi Glass Company, Ltd., Tokyo (JP)

( * ) Notice: Subject to any disclaimer, the term of this patent is extended or adjusted under 35 U.S.C. 154(b) by 0 days.

(21) Appl. No.: 10/299,761

(22) Filed: Nov. 20, 2002

(65) Prior Publication Data

US 2003/0077503 A1 Apr. 24, 2003

Related U.S. Application Data

(62) Division of application No. 09/207,114, filed on Dec. 8, 1998, now Pat. No. 6,528,200.

(51) Int. Cl.[7] ................................................. H01M 4/88
(52) U.S. Cl. ............................ 502/101; 429/42; 429/30
(58) Field of Search .............................. 429/30, 31, 32, 429/40, 41, 42; 204/283; 427/115; 502/101

(56) References Cited

U.S. PATENT DOCUMENTS

| 4,897,457 | A |   | 1/1990 | Nakamura et al. |
|---|---|---|---|---|
| 5,346,780 | A |   | 9/1994 | Suzuki |
| 5,350,643 | A | * | 9/1994 | Imahashi et al. .............. 429/33 |
| 5,795,668 | A |   | 8/1998 | Banerjee |
| 6,087,032 | A | * | 7/2000 | Yoshitake et al. ............. 429/33 |
| 6,344,291 | B1 | * | 2/2002 | Hitomi ......................... 429/42 |

FOREIGN PATENT DOCUMENTS

| JP | 09320611 A | * | 12/1997 | ............ H01M/4/86 |

* cited by examiner

*Primary Examiner*—Rabon Sergent
*Assistant Examiner*—Thao Tran
(74) *Attorney, Agent, or Firm*—Oblon, Spivak, McClelland, Maier & Neustadt, P.C.

(57) ABSTRACT

An electrode for a polymer electrolyte fuel cell, which is a porous gas diffusion electrode comprising a catalyst powder and an ion exchange resin, wherein a solvent-soluble fluorine-containing polymer having substantially no ion exchange groups exists at least at a part of the inner surface of pores of the electrode.

10 Claims, No Drawings

POLYMER ELECTROLYTE FUEL CELL, ELECTRODE FOR IT AND METHOD FOR PRODUCING IT

This is a division of Ser. No. 09/207,114 filed Dec. 8, 1998 now U.S. Pat. No. 6,528,200.

BACKGROUND OF THE INVENTION

1. Field of the Invention

The present invention relates to a polymer electrolyte fuel cell, an electrode for it and a method for producing it.

2. Discussion of Background

Attention has been drawn to a hydrogen-oxygen fuel cell as a power generation system which gives no adverse effect to the global environment, since the reaction product is only water in principle. A very high output is expected at a low operation temperature of from room temperature to about 150° C., which is being studied recently. In such a case, it is assumed to use, as a fuel, hydrogen gas obtained by reforming a hydrocarbon such as methane, methanol or gasoline and containing e.g. carbon dioxide.

On the other hand, polymer electrolyte fuel cells have a low operation temperature. Accordingly, exhaust heat can hardly be utilized, for example, as an auxiliary power, and it is utilized only for hot water at best. To offset such a drawback, it is necessary for the polymer electrolyte fuel cell to secure a high output density. Further, for practical application, it is required to secure performance of a high energy efficiency and a high output density even under an operation condition where the fuel and air utilization ratios are high.

As the electrolyte for the polymer electrolyte fuel cell, a perfluorocarbon sulfonic acid type cation exchange membrane, which is an ultrastrong acid, is mainly used, in view of the chemical stability and electric conductivity. When such an acid electrolyte is used, the following reaction occurs at an air electrode, whereby water will be formed.

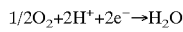

Therefore, under such an operation condition as a low operation temperature, a high current density and a high gas utilization ratio, clogging (flooding) at the pores of the electrode body is likely to take place due to condensation of steam, at the air electrode where water is formed. Accordingly, in order to obtain a stable performance of the fuel cell for a long period of time, it is necessary to secure water repellency of the electrode so as to prevent such flooding. This is particularly important in the case of a polymer electrolyte fuel cell whereby a high output density at a low temperature is desired.

To impart water repellency to the electrode, it has been studied to incorporate a fluorine-containing material to the electrode. Specifically, for example, the following methods (1) to (3) have been proposed. (1) A method in which a catalyst carrier is subjected to a fluorination treatment (JP-A-7-192738). (2) A method in which a fluorine-containing polymer is incorporated in the electrode (JP-A-5-36418). (3) A method in which a fluorinated pitch is incorporated in the electrode (JP-A-7-211324).

Among these, a fluorination treatment such as the method (1) requires a special equipment or technique, and thus it is unsuitable as a means to directly reform the surface of the carrier of the catalyst.

A fluorine-containing polymer which is insoluble in a solvent is used for the method (2). Specific examples include a tetrafluoroethylene-hexafluoropropylene copolymer (hereinafter referred to as FEP), a tetrafluoroethylene-perfluoro(alkyl vinyl ether) copolymer (hereinafter referred to as PFA) and a polytetrafluoroethylene (hereinafter referred to as PTFE). In the present specification, a A-B copolymer means a copolymer having polymer units based on A and polymer units based on B.

To incorporate such a fluorine-containing polymer in the electrode as a water repellent, it is used in the form of a powder or a dispersion of the powder. The method of forming an electrode layer containing the fluorine-containing polymer, may, for example, be a method in which the dispersion of the fluorine-containing polymer is permitted to penetrate into pores of the electrode after the electrode layer is formed (2-1), or a method in which a powder or a dispersion of the fluorine-containing polymer is mixed with the rest of material which forms the electrode and then the electrode layer is formed (2-2).

The pore size of the gas diffusion electrode for a fuel cell depends on the method of producing the electrode. However, in general, the pore size distributes from about 0.01 to about several hundreds $\mu$m. If the water repellency in pores is inadequate, clogging is likely to start from pores having a small pore size due to capillary phenomenon, in general. Accordingly, it is considered that if water repellency is imparted to the inside of pores having a pore size of at least 0.05 $\mu$m, clogging of pores due to condensed water decreases, a quick electrode reaction can be made possible, and fuel cell properties will improve.

However, the primary particle size of the solvent-insoluble fluorine-containing polymer is about 0.1 $\mu$m at smallest. Further, in the case where it is supplied in the form of a powder, it is usually granulated, and thus the average particle size is from about several $\mu$m to about 500 $\mu$m. Accordingly, it was difficult to let the solvent-insoluble fluorine-containing polymer penetrate to the inside of pores having a pore size of about 0.05 $\mu$m, by means of impregnation, spray or filtration, after the electrode layer is formed. Namely, it was difficult to adopt the method (2-1), and the electrode layer was formed by the method (2-2).

On the other hand, in the method (2-2), a catalyst, a catalyst carrier and a conductive agent powder are mixed with the solvent-insoluble fluorine-containing polymer to prepare an electrode. Generally, carbon black is used for the catalyst carrier or the conductive agent, and the particle size is from 0.02 to 0.05 $\mu$m. Namely, the particle size of the fluorine-containing polymer is larger than the particle size of carbon black. Accordingly, if the electrode is prepared by this method, the solvent-insoluble fluorine-containing polymer as a water repellent exists ununiformly in the electrode layer in the form of particles. Therefore, with this method, the inside of pores could not necessarily be made water repellent uniformly, although the pore size could be made large. Further, the solvent-insoluble fluorine-containing polymer is non-electroconductive. Accordingly, if the amount of the water repellent is increased in order to improve water repellency of the electrode, the resistance of the electrode may increase.

In the method (3), a polymerization reaction may take place in the process for producing the fluorinated pitch, and the fluorinated pitch is a polymer in a broad sense. In a case where the fluorinated pitch is insoluble in a solvent, there will be the same problems as in the method (2). Some fluorinate pitches are soluble in a fluorine-type solvent. In this case, the fluorinated pitch has a relatively low molecular weight at a level of from about 1,000 to about 3,000, and a six-membered plane structure, whereby the bonding force among molecules is weak, the film-forming property after drying is inadequate, and the fluorinated pitch is likely to fall off, so that durability is inadequate. Further, bonding between a carbon atom and a fluorine atom in the fluorinated pitch is likely to be cut in the presence of an alkali, and it is not sufficiently stable also in this respect.

SUMMARY OF THE INVENTION

It is an object of the present invention to provide an electrode for a polymer electrolyte fuel cell which is capable of keeping an adequate water repellency for a long period of time, and to provide a fuel cell having a stable performance for a long period of time, by using the electrode.

The present invention provides an electrode for a polymer electrolyte fuel cell, which is a porous gas diffusion electrode comprising a catalyst powder and an ion exchange resin, wherein a solvent-soluble fluorine-containing polymer having substantially no ion exchange groups exists at least at a part of the inner surface of pores of the electrode, and a polymer electrolyte fuel cell having the electrode.

DETAILED DESCRIPTION OF THE PREFERRED EMBODIMENTS

The electrode for a polymer electrolyte fuel cell of the present invention contains a solvent-soluble fluorine-containing polymer having substantially no ion exchange groups, which imparts water repellency to the electrode. The fluorine-containing polymer is not particularly limited so long as there is a solvent capable of dissolving it. However, preferred is a fluorine-containing polymer which is hardly soluble in a solvent such as an alcohol or water which may be a reactant or reaction product in the electrode reaction of the fuel cell.

Further, the fluorine-containing polymer may be partially fluorinated or totally fluorinated. However, it is preferably in a solid state at a temperature within a range where the polymer electrolyte fuel cell is used, and specifically, it is preferably in a solid state at a temperature of from room temperature to 150° C. Further, the fluorine-containing polymer of the present invention has substantially no ion exchange group. Specifically, the amount of the ion exchange group such as a sulfonic acid group or a carbonic acid group, is preferably at most 0.1 meq./g dry resin, particularly preferably at most 0.05 meq./g dry resin.

As the fluorine-containing polymer, a perfluorocarbon polymer having an alicyclic structure in the molecule is preferred. Such a polymer is hardly crystallizable due to twisting of the molecule attributable to the molecular structure, and it is soluble in a fluorinated solvent. Examples of the polymer include ones having cyclic structures of the following formulae, i.e. polymers having cyclic structures of the formulae 1 to 3 as polymer units. Among these, a fluorine-containing polymer having polymer units of any one of the following formulae 4 to 12, is preferred.

Formula 1

$$-(CF_2-CF\underset{(CF_2)_l}{\overset{CF_2}{\diagup}}\underset{O-(CF_2)_m}{\overset{(CFR)_n}{\diagdown}}CF)-$$

wherein l is an integer of from 0 to 5, m is an integer of from 0 to 4, n is an integer of from 0 to 1, l+m+n is from 1 to 6, and R is F or $CF_3$;

Formula 2

$$-(CF_2-CF\underset{(CF_2)_o}{\overset{CF_2}{\diagup}}\underset{(CFCl)_p}{\overset{(CF_2)_q}{\diagdown}}CF)-$$

wherein each of o, p and q which are independent of one another, is an integer of from 0 to 5, and o+p+q is from 1 to 6;

Formula 3

$$-(CF-CF)-\underset{O\diagdown\underset{R_1\,R_2}{C}\diagup O}{}$$

wherein each of $R_1$ and $R_2$ which are independent of each other, is F or $CF_3$.

Formula 4

$$-(CF_2-CF\underset{O-CF_2}{\overset{CF_2}{\diagup\diagdown}}CF)-$$

Formula 5

$$-(CF_2-CF\underset{O\diagdown CF_2 \diagup CF_2}{\overset{CF_2}{\diagup}}CF)-$$

Formula 6

$$-(CF_2-CF\underset{CF_2-CF|CF_3}{\overset{CF_2}{\diagup\diagdown}}CF)-$$

Formula 7

$$-(CF_2-CF\underset{CF_2\diagdown CFCl \diagup CF_2}{\overset{CF_2}{\diagup}}CF)-$$

Formula 8

$$-(CF_2-CF\underset{CF_2\diagdown CF_2 \diagup CF_2}{\overset{CF_2}{\diagup}}CF)-$$

Formula 9

$$-(CF-CF)-\underset{O\diagdown\underset{CF_3\,CF_3}{C}\diagup O}{}$$

Formula 10

$$-(CF_2-CF-CF-CF_2)-\underset{O\diagdown CF_2 \diagup CF_2}{}$$

Formula 11

$$-(CF_2-CF-CF-CF_2)-\underset{O\diagdown CF_2 \diagup O}{}$$

-continued

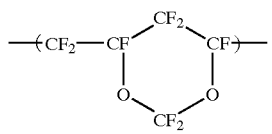

Formula 12

Such a fluorine-containing polymer can be dissolved in a fluorinated solvent such as perfluorobenzene, trifluoroethane, AFLUDE (tradename of a fluorinated solvent manufactured by Asahi Glass Company Ltd.), or perfluoro(2-butyltetrahydrofuran), or in a solvent containing polyfluoroalkyl groups, and a solution having a concentration of from 0.01 to 50 wt % can be obtained.

As the fluorine-containing polymer of the present invention, a polymer made by partial fluorination of a non-acrylic resin may be preferably used, in addition to polymers of the formulae 1 to 3. Specifically, preferred is a copolymer having polymer units based on a fluoroolefin and polymer units based on at least one monomer selected from the group consisting of a vinyl ether, a vinyl ester, an allyl ether, an allyl ester, an isopropenyl ether, an isopropenyl ester, an acrylic ester and a methacrylic ester.

As the vinyl ether, an alkyl vinyl ether such as ethyl vinyl ether, butyl vinyl ether or cyclohexyl vinyl ether, a (fluoroalkyl vinyl)ether or a (perfluoroalkyl vinyl)ether made by partial or total fluorination of hydrogen atoms of the alkyl vinyl ether may, for example, be mentioned. As the vinyl ester, a fatty acid vinyl ester such as Beobar-10 (tradename of a commercial product manufactured by Shell Chemical) having branched alkyl groups, vinyl acetate, vinyl butyrate, vinyl pivalate or vinyl batatiate may, for example, be mentioned. The hydrogen atoms of the vinyl ester may be partially or totally substituted with fluorine.

As the allyl ether, an alkyl allyl ether such as ethyl allyl ether or cyclohexyl allyl ether may, for example, be mentioned. As the allyl ester, a fatty acid allyl ester such as allyl propionate or allyl acetate may, for example, be mentioned. As the isopropenyl ether, an alkylisopropenyl ether such as methylisopropenyl ether may, for example, be mentioned. The hydrogen atoms of the allyl ether may be partially or totally substituted with fluorine.

With regard to the copolymer having polymer units based on a fluoroolefin, the polymer units based on a fluoroolefin are contained preferably in an amount of from 30 to 70 mol %, particularly preferably from 40 to 60 mol %, since if the ratio of the polymer units based on a fluoroolefin is excessively large, the solubility in a solvent decreases.

The polymer obtained by partial fluorination of the non-acrylic polymer can be dissolved in at least one member selected from the group consisting of a ketone, an ester, a chloroethane and a benzene derivative, and the concentration of the solution can be made from 30 to 70 wt %.

The perfluorocarbon polymer having an alicyclic structure in the molecule and the polymer made by partial fluorination of a non-acrylic resin, which are mentioned above as the solvent-soluble fluorine-containing polymers, are hardly decomposable to a monomer, and thus they are not likely to undergo radical propagation, and excellent in acid resistance and alkali resistance.

The molecular weight of the fluorine-containing polymer of the present invention is preferably from about 2,000 to about 200,000, particularly preferably from about 5,000 to about 10,000. In the case where the weight concentration of the solution of the fluorine-containing polymer is same, in general, the larger the molecular weight of the polymer, the higher the viscosity of the solution having the polymer dissolved in the solvent. When using a polymer having a molecular weight within the rage as defined above, in the case where the electrode is impregnated in the solution of the fluorine-containing polymer to impart water repellency to the electrode, it is possible to keep the viscosity of the solution at a level where penetrability of the solution to the electrode is adequate, and at the same to obtain adequate adhesion to the surface of pores of the fluorine-containing polymer, and to maintain the water repellency of the electrode for a long period of time.

The electrode for a polymer electrolyte fuel cell comprises a catalyst powder, an ion exchange resin and a fluorine-containing polymer having substantially no ion exchange group and being soluble in a solvent. In addition, carbon to increase conductivity, a binder or a base material such as a fiber to maintain the shape, or a moisturizer such as $SiO_2$ or $TiO_2$ to absorb water, may be incorporated.

Various methods can be employed for producing the electrode for a polymer electrolyte fuel cell, by using the solution of the fluorine-containing polymer of the present invention. For example, it is possible to mix a solution having the fluorine-containing polymer dissolved, with a catalyst powder or an ion exchange resin which is another component to form the electrode, to form the electrode. It is also possible to spray or impregnate the solution to the electrode after the electrode is formed from such another component. Further, in a case where water repellency of the electrode has decreased after the fuel cell is used, it is possible to impart water repellency again to the electrode, by using the solution, i.e. by impregnation or spraying, as the case requires.

In the present invention, the solution having the fluorine-containing polymer dissolved can be used. Therefore, even if the particle size of another electrode-constituting material is small, or no matter how small the pore size of pores of the electrode, the fluorine-containing polymer exists on the inner surface of pores of the electrode after the solvent was removed by drying. The amount of the fluorine-containing polymer of the present invention existing in the electrode is preferably from 0.001 to 30 wt %, more preferably from 0.01 to 20 wt %.

As a method of producing the electrode for a polymer electrolyte fuel cell of the present invention, a known method such as spraying, coating or filtration of a mixed liquid comprising a catalyst powder of platinum-black or platinum supported on activated carbon, an ion exchange resin and, and if necessary, a pore forming agent, a thickener or a diluting solvent, is preferably employed. The water repellent may be preliminarily mixed in the mixed liquid, as mentioned above.

When producing a polymer electrolyte fuel cell using the electrode of the present invention, as a method of bonding the electrode and the ion exchange membrane as a solid polymer electrolyte, a method of directly forming the electrode on the ion exchange membrane, a method of forming the electrode in the shape of a layer on the substrate such as carbon paper, then bonding the electrode with the ion exchange membrane, or a method of forming the electrode on a plate and transferring the electrode to the ion exchange membrane, is preferably employed. When the electrode is formed separately from the ion exchange membrane, as the method of bonding the electrode to the ion exchange membrane, a hot press method or a bonding method (JP-A-7-220741, JP-A-7-254420) may, for example, be employed.

The ion exchange resin and the ion exchange membrane as a solid polymer electrolyte, contained in the electrode of the present invention, are preferably made of a fluorocarbon sulfonic acid type ion exchange resin or a fluorocarbon phosphonic acid type ion exchange resin. Particularly preferably, they are made of a perfluorocarbon sulfonic acid type ion exchange resin comprising a copolymer having polymer units based on $CF_2=CF_2$ and polymer units based on $CF_2=CF-(OCF_2CFX)_m-O_p-(CF_2)_n-SO_3H$, wherein m is an integer of from 0 to 3, n is an integer of from 1 to 12, p is 0 or 1, and X is F or $CF_3$, is preferred.

It is preferred to use PTFE, FEP, PFA or the like as the binder for the electrode of the present invention, and the amount is preferably from 0.01 to 30 wt % to the electrode. Such a binder has a function also as a water repellent. Further, it is preferred that the electrode contains a thickener of ethyl cellulose type, methyl cellulose type or cellosolve type.

Further, when forming the electrode, a diluting solvent may be used. As the diluting solvent, a fluoroalkane, a fluorotrialkylamine, a fluoroalkyltetrahydrofuran, a ketone, an ester, a chloroethane, a benzene derivative, an alcohol such as methanol, ethanol or isopropanol, a fluorocarbon, a hydrofluorocarbon, a hydrochlorofluorocarbon or water may, for example, be used.

The electrode of the present invention has a water repellency equal to or more than the ordinary electrode, and at the same time, the amount of a non-electroconductive resin can be made small, whereby the electrode can be made thin. Accordingly, it has an excellent gas diffusion property and low resistance, whereby it can be effectively used as both an air electrode and a hydrogen electrode. Further, it is possible to use the electrode of the present invention as an electrode at which water is formed by the reaction, and to use an electrode having no water repellency as the other electrode, to obtain a fuel cell having high reliability for a long period of time.

In the present invention, a solution of the solvent-soluble fluorine-containing polymer is used. Therefore, it is possible to uniformly coat the surface of the catalyst in the pores of the electrode by the fluorine-containing polymer, and to impart an adequate water repellency to the electrode by the fluorine-containing polymer, even if the amount of the fluorine-containing polymer is small. Further, in the case where the fluorine-containing polymer is incorporated to the electrode by e.g. impregnation or spraying, after the electrode is formed, it is easy to secure durability for the water repellent coating film obtained by drying, since the solution of the fluorine-containing polymer of the present invention has a film-forming property.

Further, in the production process to impart water repellency to the electrode, it is possible to impart water repellency to the electrode with high durability by the same operation as usual or a simpler operation than usual.

Now, specific embodiments of the present invention will be described with reference to working Examples (Examples 1, 4 and 6) and Comparative Examples (Examples 2, 3 and 5). However, the present invention is by no means restricted by such specific Examples.

EXAMPLE 1

A solution composed mainly of ethanol and having a catalyst having 40 wt % of platinum supported on a carbon black powder and an ion exchange resin made of a $CF_2=CF_2/CF_2=CF-OCF_2CF(CF_3)-OCF_2CF_2SO_3H$ copolymer having an ion exchange capacity of 1.1 meq./g dry resin dispersed therein; and a solution having 10 wt % of a polymer of the following formula 10 having a molecular weight of about 100,000 (tradename: CTL-110S, manufactured by Asahi Glass Company Ltd.) as a solvent-soluble fluorine-containing polymer dissolved in a mixed solvent of perfluoro(2-butyltetrahydrofuran) and perfluoro (tributylamine) at a weight ratio of 1:1, were mixed to prepare a catalyst dispersion A. The weight ratio of the catalyst (inclusive of the carrier), the ion exchange resin and the solvent-soluble fluorine-containing polymer in the catalyst dispersion A, was 80:19:1. Further, a catalyst dispersion B was prepared in the same manner as the catalyst dispersion A, except that the solvent-soluble fluorine-containing polymer was not contained (the weight ratio of the catalyst and the ion exchange resin in the solution was 80:20).

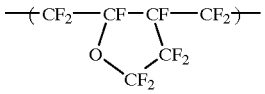

Formula 10

Using, as an ion exchange membrane which is a solid polymer electrolyte, a perfluorosulfonic acid type ion exchange membrane (tradename: Flemione® S membrane, manufactured by Asahi Glass Company Ltd., ion exchange capacity: 1.0 meq./g dry resin, thickness: 80 μm), the catalyst dispersion A and the catalyst dispersion B were sprayed to the air electrode side and the hydrogen electrode side, respectively, of the ion exchange membrane, so that the content of platinum was 0.5 mg/cm² on each side, followed by drying for one hour at a temperature of 120° C. to obtain an electrode/membrane assembly (electrode area: 10 cm²).

EXAMPLE 2

An electrode/membrane assembly was prepared in the same manner as in Example 1, except that PTFE fine powder (secondary particle size: 2 μm, primary particle size: 0.1 μm) was used instead of the solvent-soluble fluorine-containing polymer, as a water repellent in the catalyst dispersion A to be sprayed to the air electrode side.

EXAMPLE 3

An electrode/membrane assembly was prepared in the same manner as in Example 1, except that the catalyst dispersion B was sprayed to both the air electrode side and the hydrogen electrode side to obtain the electrode.

EXAMPLE 4

A catalyst having 40 wt % of platinum supported on a carbon black powder and granulated PTFE were kneaded at a weight ratio of 80:20, and the mixture was coated on a porous film so that the platinum content became 0.5 mg/cm². Then, the electrode was impregnated in a solution having the same ion exchange resin as in Example 1 dispersed in ethanol, so that the ion exchange resin was present on the surface of the electrode in an amount of 1 mg/cm². Then, the electrode was impregnated in a solution having 0.05 wt % of a polymer of $CF_2=CFO(CF_2)_2CF=CF_2$ (molecular weight: about 100,000) dissolved in a mixed solvent of perfluoro (2-butyltetrahydrofuran) and perfluoro(tributylamine) at a weight ratio of 1:1, so that the polymer was present on the surface of the electrode in an amount of 0.01 mg/cm², followed by drying for one hour at a temperature of 120° C. to prepare a diffusion electrode A. Further, a diffusion electrode B was prepared in the same manner as the diffusion electrode A, except that the electrode was not impregnated in the solution of the fluorine-containing polymer.

To the same ion exchange membrane as used in Example 1, the diffusion electrode A and the diffusion electrode B were hot-pressed to the air electrode side and the hydrogen electrode side, respectively, at a temperature of 150° C. under pressure of 10 kg/cm², to obtain an electrode/membrane assembly (electrode area: 10 cm²).

EXAMPLE 5

An electrode/membrane assembly was prepared in the same manner as in Example 4, except that the diffusion electrode B was used for both the hydrogen electrode side and the air electrode side.

EXAMPLE 6

The catalyst dispersion A was sprayed to an ion exchange membrane followed by drying to obtain an air electrode in the same manner as in Example 1, except that a perfluorosulfonic acid type ion exchange membrane (tradename: Flemion® R membrane, manufactured by Asahi Glass Company Ltd., ion exchange capacity: 1.0 meq./g dry resin) having a thickness of 50 μm was used as the ion exchange membrane.

Then, to a gas diffusion layer made of polytetrafluoroethylene and carbon at a weight ratio of 30:70, a solution composed mainly of ethanol and having a catalyst having 40 wt % of platinum supported on carbon black and an ion exchange resin made of a $CF_2=CF_2/CF_2=CF-OCF_2CF(CF_3)-OCF_2CF_2SO_3H$ copolymer having an ion exchange capacity of 1.1 meq./g dry resin dispersed therein, was coated to prepare a hydrogen electrode. The weight ratio of the catalyst and the ion exchange resin in the hydrogen electrode was 70:30. The hydrogen electrode was bonded to the ion exchange membrane having the air electrode formed thereon to prepare an electrode/membrane assembly.

The electrode/membrane assembly prepared in each of Examples 1 to 6 was assembled into a cell for measurement, and while supplying hydrogen gas to the hydrogen electrode and air to the air electrode, continuous operation of the cell was carried out at a constant driving voltage of 0.65 V at a cell temperature of 70° C. at 3 ata, whereby the change with time of the output current density was measured. The results are shown in Table 1.

TABLE 1

| | Output current density (A/cm²) | | |
|---|---|---|---|
| | 10 Hours later | 100 Hours later | 1,000 Hours later |
| Example 1 | 0.80 | 0.80 | 0.79 |
| Example 2 | 0.80 | 0.65 | 0.53 |
| Example 3 | 0.81 | 0.50 | 0.28 |
| Example 4 | 0.72 | 0.71 | 0.71 |
| Example 5 | 0.72 | 0.50 | 0.40 |
| Example 6 | 0.82 | 0.82 | 0.81 |

As described in the foregoing, according to the method of the present invention, it is possible to impart water repellency to a gas diffusion electrode easily and uniformly with high durability. Further, by using the electrode of the present invention, a polymer electrolyte fuel cell is obtainable which shows little deterioration with time of the output characteristics.

What is claimed is:

1. A method for producing a polymer electrolyte fuel cell, the method comprising forming a solution by dissolving a solvent-soluble fluorine-containing polymer in a solvent;

forming a porous gas diffusion electrode by mixing a catalyst powder, an ion exchange resin, and the solution; and bonding the porous gas diffusion electrode to an ion exchange membrane, wherein the solvent-soluble fluorine-containing polymer contains ion exchange groups in an amount of at most 0.1 meq./g dry ion exchange resin.

2. The method according to claim 1, wherein the mixing comprises forming a mixture of the catalyst powder and the ion exchange resin; and spraying the solution onto the mixture.

3. The method according to claim 1, wherein the mixing comprises forming a mixture of the catalyst powder and the ion exchange resin; and impregnating the mixture with the solution.

4. The method according to claim 1, wherein the solvent-soluble fluorine-containing polymer contains ion exchange groups in an amount of at most 0.05 meq./g dry ion exchange resin.

5. The method according to claim 1, wherein the solvent-soluble fluorine-containing polymer contains substantially no ion exchange groups.

6. The method according to claim 1, wherein the solvent-soluble fluorine-containing polymer contains no ion exchange groups.

7. The method according to claim 1, wherein the solvent-soluble fluorine-containing polymer contains units of formula 10:

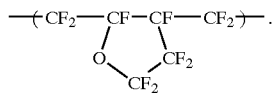

8. The method according to claim 1, wherein the solvent is a fluorinated solvent.

9. The method according to claim 8, wherein the fluorinated solvent is selected from the group consisting of perfluorobenzene, trifluoroethane, and perfluoro(2-butyltetrahydrofuran).

10. The method according to claim 1, wherein the fluorine-containing polymer has an alicyclic structure.

* * * * *